United States Patent [19]

Hibino et al.

[11] Patent Number: 4,795,015

[45] Date of Patent: Jan. 3, 1989

[54] CLUTCH OPERATION CONTROL SYSTEM FOR FLUID TORQUE CONVERTER OF VEHICULAR TRANSMISSION

[75] Inventors: Yoshitaka Hibino; Hiroshi Ikura, both of Saitama, Japan

[73] Assignee: Honda Giken Kogyo Kabushiki Kaisha, Tokyo, Japan

[21] Appl. No.: 62,893

[22] Filed: Jun. 16, 1987

[30] Foreign Application Priority Data

Jun. 16, 1986 [JP] Japan .................... 61-138400

[51] Int. Cl.$^4$ .................... F16H 45/02; B60K 41/02
[52] U.S. Cl. .................... 192/0.076; 192/3.29
[58] Field of Search .................... 192/3.29, 3.3, 3.31, 192/0.076

[56] References Cited

U.S. PATENT DOCUMENTS

| | | | |
|---|---|---|---|
| 3,999,449 | 12/1976 | Chana et al. | 74/844 |
| 4,331,226 | 5/1982 | Heidemeyer et al. | 192/0.076 |
| 4,619,350 | 10/1986 | Maezono et al. | 192/3.31 |

Primary Examiner—Rodney H. Bonck
Attorney, Agent, or Firm—Lyon & Lyon

[57] ABSTRACT

A controlled system for the clutch in a torque converter of an automatic transmission wherein the clutch is normally engaged in a predetermined range of vehicle and engine operating conditions for efficient operation. An atmospheric pressure sensor is used in the control system to disengage the clutch in that predetermined range at higher altitudes to allow the torque converter to function to increase the torque being transmitted thereby compensating for the reduced engine performance at higher altitudes.

5 Claims, 3 Drawing Sheets

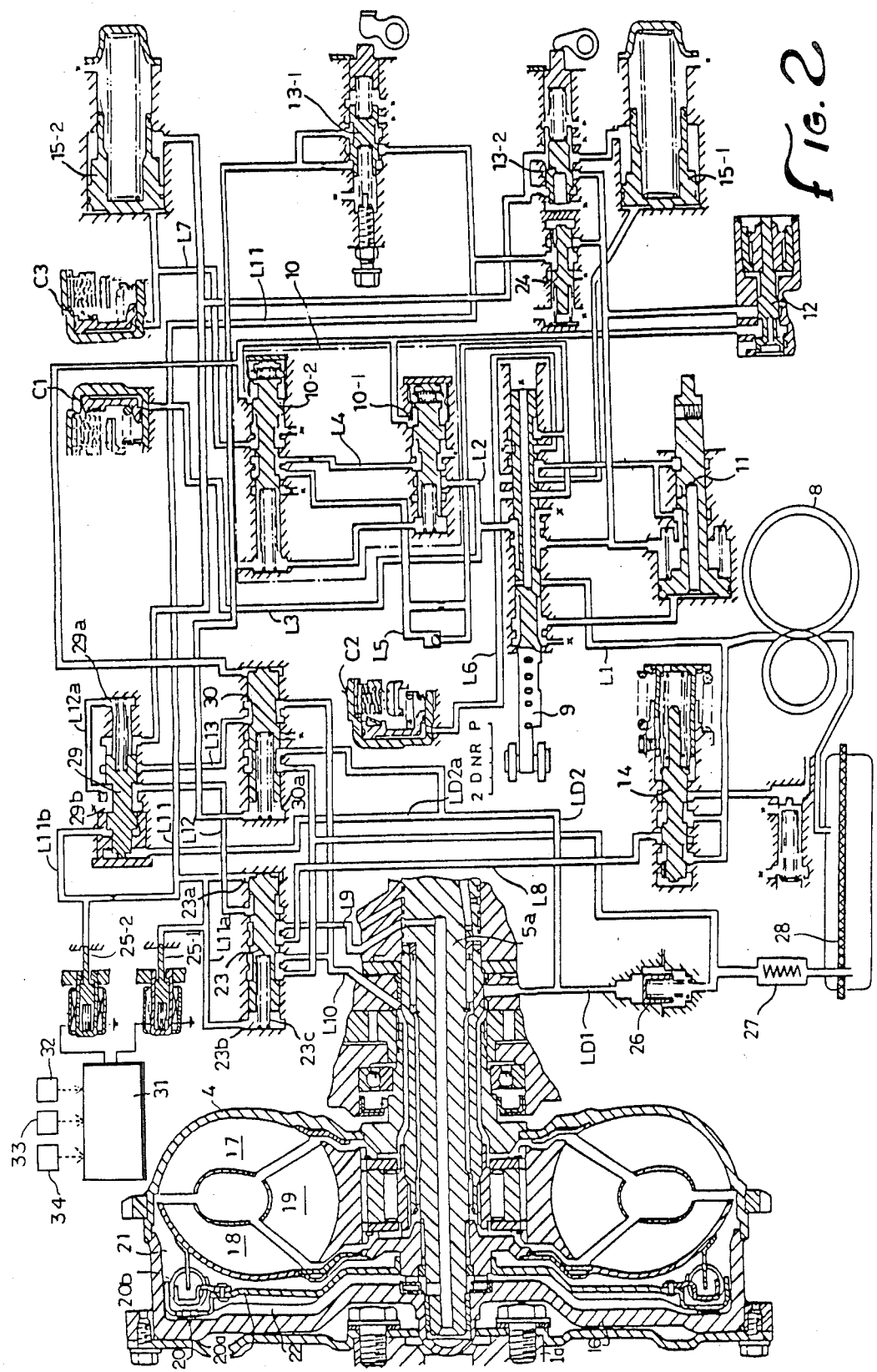

CLUTCH OPERATION CONTROL SYSTEM FOR FLUID TORQUE CONVERTER OF VEHICULAR TRANSMISSION

The present invention relates to a system for controlling the operation of a clutch that is provided with a fluid torque converter of a vehicular transmission to mechanically connect the input side to the output side of the fluid torque converter under certain operating conditions.

This type of clutch has been utilized in fluid torque converters to eliminate inefficiencies by establishing a directly connecting state that eliminates all slippage in the torque converter or in a slipping state for employing the advantages of the fluid torque converter. The clutch operation is predetermined in accordance with one or more conditions, such as vehicle speed and throttle opening, under which a vehicle travels. Such a system is disclosed in the specification of, for instance, Japanese Patent Application early opening (Kokai) No. 59-86737 (1984).

Heretofore, there have been some difficulties with vehicle performance as a result of these fluid torque converter systems when the vehicle is operated at high altitudes. The amount of air supplied to an engine is substantially diminished when operating at high altitudes where the outside atmospheric pressure is relatively low, which results in a decrease in the output of the engine. In turn, this results in very poor acceleration characteristics of the vehicle.

However, by means of a fluid torque converter, an action of torque amplification is obtained, whereby it may be feasible to compensate for the drop in acceleration characteristics to some extent. However, there is a problem since the input side of the fluid torque converter is mechanically connected to the output side thereof by virtue of the operation of the clutch in the clutch connecting region of operation whereby the action of torque amplification is not procured by us of the fluid torque converter.

Accordingly, it is a primary object of the present invention to obviate the above-described problem to provide a clutch operation control system which enhances the drivability of the vehicle while travelling at high altitudes.

To accomplish the aforementioned object, an improved clutch operation control system is provided for a clutch that normally mechanically connects the input side of a fluid torque converter to its output side and in a clutch operation region that is predetermined in accordance with normal travelling conditions of the vehicle, wherein the operation of the clutch in the clutch operation region is partially or entirely halted when the outside atmospheric pressure is lower than a given value as determined by atmospheric pressure detecting means for allowing clutch slippage to occur to thereby transmit the torque through the fluid torque converter.

The above and other objects and advantages of the present invention will readily appear to those skilled in the art from the following description and the accompanying drawings, wherein:

FIG. 2 is a hydraulic circuit diagram of the vehicular transmission illustrated in FIG. 1 with the electronic control circuit employed system of the present invention;

Figure 1:
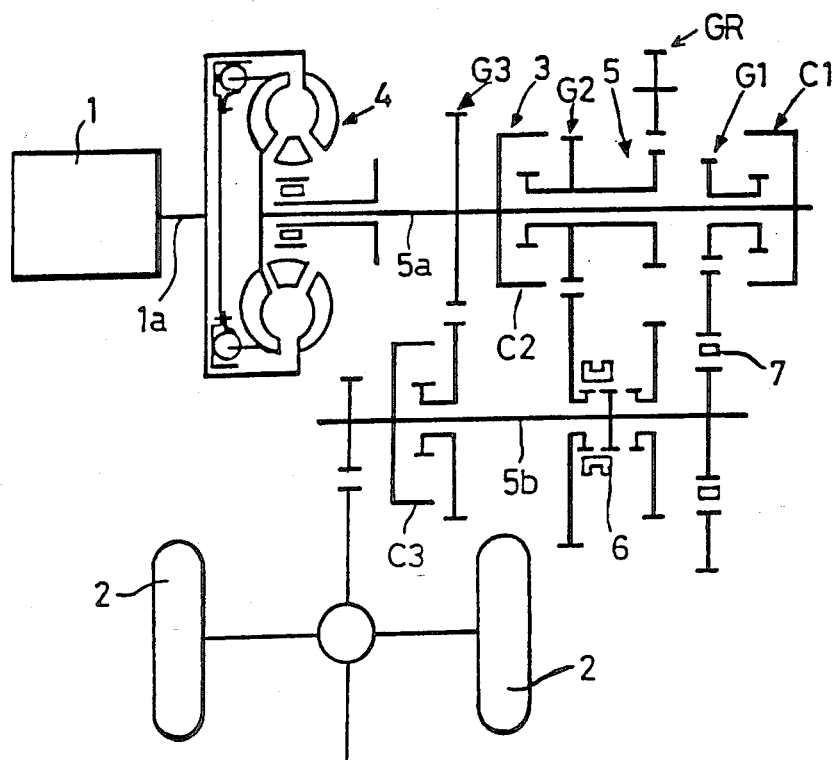
FIG. 1 is a diagrammatic illustration of a typical vehicular transmission to which the present invention is applicable.

Referring now to FIG. 1, a vehicle (not shown) is provided with an engine 1 and drive wheels 2 with a vehicular transmission 3 connecting the engine 1 to the drive wheels 2 in a conventional manner. The transmission 3 includes a fluid torque converter 4 and a multi-speed automatic transmission 5 for establishing any one of three forward speeds and one reverse speed.

The transmission 5 is provided with 1st, 2nd and 3rd speed forward gear trains G1, G2 and G3 and a reverse gear train GR between a driving shaft 5a leading to the fluid torque converter 4 and a driven shaft 5b leading to the drive wheels 2. To the forward gear trains G1, G2 and G3, respectively, there are attached hydraulic clutches C1, C2 and C3 so that the gear trains G1, G2 and G3 may be selectively established by applying the hydraulic clutches C1, C2 and C3, respectively. On the other hand, the reverse gear train GR shares the 2nd speed hydraulic clutch C2 with the 2nd speed gear train G2 so that it is established by either the rightward or the reverse switching operation of a selector gear 6 for selecting one of the two gear trains G2 and GR. Indicated at reference numeral 7 is a one-way clutch which is disposed in the 1st speed gear train G1 and which operates to allow over rotation of the output shaft 5b, such as when the drive is established through gear trains G2 or G3.

The aforementioned respective hydraulic clutches C1, C2 and C3 have their oil supplies and drains controlled by a hydraulic circuit shown in FIG. 2, for example. The hydraulic circuit of FIG. 2 is provided with: an oil pressure source 8; a manual valve 9 which can be switched among five positions, i.e., a parking range "P", a reverse range "R", a neutral range "N", a drive range "D" and a 2nd-speed holding range "2"; a shift valve 10 adapted to be switched in accordance with the vehicular speed and the throttle opening of the engine; and a forward-reverse switching servo-valve 11 for selectively coupling the aforementioned selector gear 6. In the "D" range position of the manual valve 9, a 1st oil line L1 providing an oil supply leading from the oil pressure source 8 is connected through valve 9 to a 2nd oil line L2 leading to the shaft valve 10 so that the oil is supplied to the 1st speed hydraulic clutch C1 via a 3rd oil line L3 branched from said 2nd oil line L2 and to the respective 2nd and 3rd speed hydraulic clutches C2 and C3 via the shift valve 10. The shift valve 10 is comprised of an upstream side 1st-speed/2nd-speed first shift valve 10-1 and a downstream side 2nd-speed/3rd-speed second shift valve 10-2 which are connected with each other via an intermediate 4th oil line L4. Each of the valves 10-1 and 10-2 has one end, i.e., its righthand end as shown in FIG. 2, supplied with a governor pressure from a governor valve 12 related to the vehicular speed and its other (lefthand) end supplied with a throttle pressure from a first throttle valve 13-1 related to the throttle opening of the engine. As the vehicular speed increases over the 1st-2nd speed change characteristic curve indicated at X1 in FIG. 3, the first valve 10-1 moves from the righthand 1st speed position to the lefthand 2nd speed position so that the 2nd oil line L2 is connected via the 4th oil line L4 with a 5th oil line L5 at the exit side of the second shift valve 10-2 thereby to supply the oil pressure to the 2nd speed hydraulic clutch C2 by way of a 6th oil line L6 which is connected with said 5th oil line L5 in the "D" range position of the manual valve 9. As the vehicular speed further increases over the 2nd-3rd speed change characteristic curve indicated at X2 in FIG. 3, the second shift valve 10-2 moves from the righthand 2nd speed position to the lefthand 3rd speed position so that the 4th oil line L4 has its connection switched from the 5th oil line L5 to a 7th oil line L7 leading to the 3rd speed hydraulic clutch C3 thereby to supply the oil pressure to the 3rd speed hydraulic clutch C3.

Indicated at reference numeral 14 in the drawing is a regulator valve for regulating the oil pressure supplied from the oil pressure source 8 to a constant line pressure. Numerals 15-1 and 15-2 indicate 2nd and 3rd speed accumulators which lead to the 2nd and 3rd speed oil pressure clutches C2 and C3, respectively. The throttle pressure according to the throttle opening is applied as a back pressure from the 2nd throttle valve 13-2 to each of the accumulators 15-1 and 15-2.

The aforementioned fluid torque converter 4 is provided with an internal space defined by an input case 16 on one side connected to the crankshaft 1a of the engine and by pump 17 on the other side connect to the input case 16. In that internal space, there is provided a turbine 18 connected to the drive shaft 5a of the transmission 5 and a stator 19 interposed between the pump 17 and the turbine 18. The fluid torque converter 4 is further equipped with a hydraulically actuated clutch 20 for mechanically connecting the input side of said torque converter 4, i.e., the input case 16, and the output side of the same, i.e., the turbine 18. Thus, when the clutch 20 is released, a fluid torque transmission mode of operation is provided by the circulation of the internal fluid among the aforementioned pump 17, turbine 18 and stator 19 in a conventional manner. When the clutch 20 is applied, on the other hand, a mechanical torque transmission is provided directly between the input case 16 and the turbine 18.

The clutch 20 may be of various types, such as a single-disc or multi-disc friction type. In the shown example, the clutch 20 is a single-disc friction clutch which has its clutch disc 20a movable in the axial direction in the gap between the input case 16 and the turbine 18 and connected to the turbine 18 through damper springs 20b. The internal space of the fluid torque converter 4 is partitioned by the clutch disc 20a into a 1st vane accommodating chamber 21 located at one side of the clutch disc 20a and a back pressure chamber 22 located between the other side of the clutch disc 20a and the input case 16. The clutch can be switched by a later-described control valve 23 to a disconnected state, in which the oil is supplied to the back pressure chamber 22 of the internal space, and to a connected state in which the oil is supplied to said chamber 21. In the clutch-connected state, the clutch disc 20a is brought into frictional engagement with the input case 16 by the engaging force according to the pressure difference between the internal pressure (which will be identified as Pa) of the accommodating chamber 21 and the internal pressure (which will be identified a Pb) of the back pressure chamber 22.

The control valve 23 can be switched between a righthand side clutch-released position (i.e., the shown position), in which an 8th oil line L8 leading to the regulator valve 14 is connected with a 9th oil line L9 leading to the back pressure chamber 22 to supply the pressurized oil to the back pressure chamber 22, and a lefthand side clutch-applied position in which the 8th oil line 18 is connected with a 10th oil line L10 leading to the vane accommodating chamber 21 thereby to supply the pressurized oil to the chamber 21. The control valve 23 has its righthand oil chamber 23a supplied through a 11th oil line L11 with an output pressure (which will be identified as Pm) from a modulator valve 24 on the upstream side of the aforementioned 1st throttle valve 13-1 and its lefthand oil chamber 23b connected with an oil line L11a having an orifice leading to the 11th oil line L11. The oil line L11a is connected to a 1st atmospheric release valve 25-1 which is an electromagnetic type. When the release valve 25-1 is opened, the control valve 23 is switched to the clutch applied position against the action of a spring 23c by the pressure difference between the two oil chambers 23a and 23b to apply the clutch 20.

A 1st regulating valve 26 comprised of a check valve disposed in the 1st drain line LD1 leading to the vane accommodating chamber 21 regulates the pressure Pa to a predetermined relatively high level. An oil cooler 27 and an oil reservoir 28 are also provided.

In accordance with the changes in the engaging force due to the increase or decrease of the difference between the pressure Pa and Pb, the operating state of the clutch 20 is switched between a directly applied state in which its input and output sides are directly connected and a slipping state in which the input and output sides are allowed to slip. The system is constructed to variably control that pressure difference, i.e., the engaging force in accordance with the running state of the engine and vehicle. Specifically, there are provided a 12th oil line L12, which is connected with the 9th oil line L9 leading to the back pressure chamber 22 in the clutch applied position of the control valve 23, and a 13th oil line L13 which is branched from the 10th oil line L10 leading to the vane accommodating chamber 21. The two oil lines L12 and L13 are connected through a 2nd regulating valve 29 to provide a communication passage for communicating the two chambers 21 and 22. Moreover, a 2nd drain line LD2 is provided in parallel with the 1st regulator valve 26 disposed in the aforementioned 1st drain line LD1. There is also provided a control valve 30 for opening said 2nd drain line LD2 and said 13th oil line L13 in the slipping state of the clutch 20 and closing said two oil lines LD2 and L13 in the directly connected state. More specifically, said control valve 30 is urged in the leftward closing direction by the governor pressure coming from the governor valve 12 and in the rightward opening direction by the action of a spring 30a and the throttle pressure coming from the 1st throttle valve 13-1 so that it is switched between an opening (shown) position, in which it opens said two oil lines LD2 and L13 in a speed range lower than a curve Z of FIG. 3, and a closing position in which it closes the same in a higher speed range.

The aforementioned 2nd regulator valve 29 is of a pressure difference responding type, in which it is urged in the rightward opening direction by the oil pressure acting via a pilot oil line LD2a branched from the 2nd drain line LD2 (i.e., the pressure Pa) and in the leftward closing direction by the oil pressure acting via a pilot oil line L12a leading to said 12th oil line L12 (i.e., the pressure Pb). The 2nd regulator valve 29 is further urged in the closing direction by the action of a spring 29a and a throttle pressure (which will be identified as PO) coming from a 2nd throttle valve 13-2 and in the opening direction by the pressure Pm inputted form the aforementioned 11th oil line L11 via an oil line L11b with an orifice. This oil line L11b is connected to an electromagnetic type 2nd atmospheric release valve 25-2.

The above-mentioned 1st and 2nd atmospheric air pressure releasing valves 25-1 and 25-2 are so controlled as to be opened and closed by means of an electronic control circuit 31 equipped with a microcomputer. To this control circuit 31 are inputted a signal corresponding to the throttle opening degree which is transmitted from throttle opening degree detecting means 32, a signal corresponding to the velocity of the vehicle which is transmitted from car speed detecting means 33 and a signal corresponding to the outside atmospheric pressure which is transmitted form atmospheric pressure detecting means 34. The 1st atmospheric air releasing valve 25-1 is, as will be described later, opened in the clutch operation region encompassed by an oblique line, which represents a higher velocity than the line Y of FIG. 3. Then the clutch 20 is, as described above, operated. The 2nd atmospheric air releasing valve 25-2 is opened when the velocity of the vehicle is at a level between V1 and V2, but this valve remains closed in at all other times.

Figure 3:
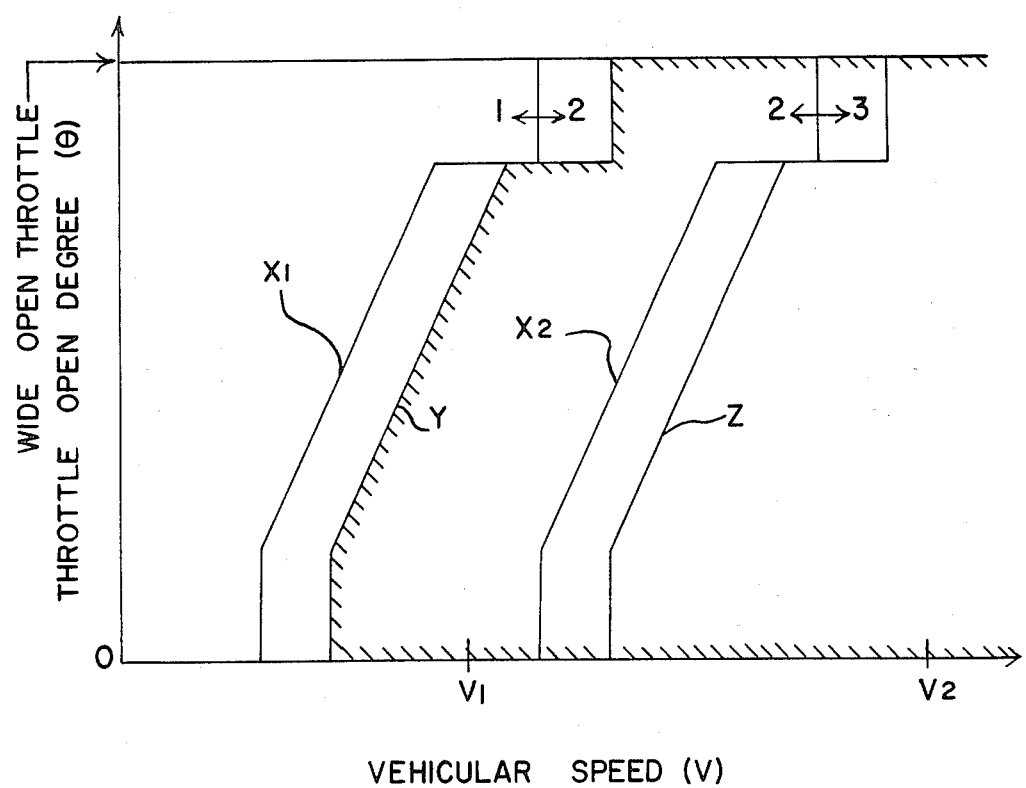
FIG. 3 is a graph of vehicle and engine operating characteristics or conditions that determine the mode of operation of the clutch.

In a vehicle speed range higher than curve Z in FIG. 3, the control valve 30 is switched to its closing position, as has been described above, to close the 13th oil line L13 and the 2nd drain line LD2 to supply the oil not from the 13th oil line L13 to the 12th oil line L12 but from the 12th oil line L12 to a drain port 29b of the 2nd regulator valve 29 so that the pressure Pb approaches the atmospheric value. Further, the drainage via the 2nd drain line LD2 is interrupted so that the pressure Pa is held at a relatively high level determined by the 1st regulator valve 26. As a result, the difference between the pressures Pa and Pb is raised to increase the engaging force of the clutch so that the clutch 20 is applied in the directly connected state.

In the vehicular speed range between the curves Y and Z, on the other hand, the control valve 30 is switched to its opening position, in which the 2nd drain line LD2 and the 13th oil line L13 are opened to drain the oil from the inside of the vane accommodating chamber 21 through the 2nd drain line LD2 rather than via the 1st regulator valve 26 so that the pressure Pa assumes a relatively low level determined by the passage resistance of said 2nd drain line LD2. On the other hand, the back pressure chamber 22 is supplied with the oil pressure, which is regulated by the 2nd pressure regulating valve 29, via the communication line composed of the 13th oil line L13 and the 12th oil line L12 to drop the difference between the pressures Pa and Pb to a lower level than that in the directly connected state so that the clutch 20 is applied in the slipping state. Thus, the torque fluctuations that ar likely to increase in a low vehicular speed range are absorbed through the slippage of the clutch 20 to prevent the vehicular body from vibrating.

Assuming the 2nd regulator valve 29 has an area A1 for receiving the pressures Pa and Pb and an area A2 for receiving the pressures PO and Pm, and assuming the spring 29a has a force F, the relationship among the forces acting upon the 2nd regulator valve 29 is expressed by the following Equation:

$$PaA1 + PmA2 = PbA1 + POA2 + F$$

Hence, the following Equation holds:

$$Pa - Pb = A2/A1 \cdot PO + F/A1 - A2/A1 \cdot Pm \quad (1).$$

In this case, when the 2nd atmospheric air releasing valve 25-2 is opened, the value of Pm in the formula 1 becomes zero, and proportionally the engaging force of the clutch increases.

Therefore, even in the region between the lines Y and Z of FIG. 3 where the clutch 20 functions in the slipping state, the amount of slippage of the clutch 20 decreases, as compared with the value in the lower car speed region than V1, in the higher car speed region than V1 where the 2nd atmospheric air releasing valve 25-2 is opened. The amount of slippage required for absorbing the fluctuations in torque, however, diminishes in proportion as the velocity of the vehicle rises, and the vehicular vibration can therefore be prevented in an effective manner.

In the clutch operation region where the velocity is higher than the line Y, even in a region lower than V1 where relatively large slippage of the clutch 20 is created, the torque amplification function of the fluid torque converter 4 is not obtained. Normally there is no compensation for the drop in acceleration which is caused by the decrease in output of the engine at high altitude with the action of torque amplification.

Figure 4:
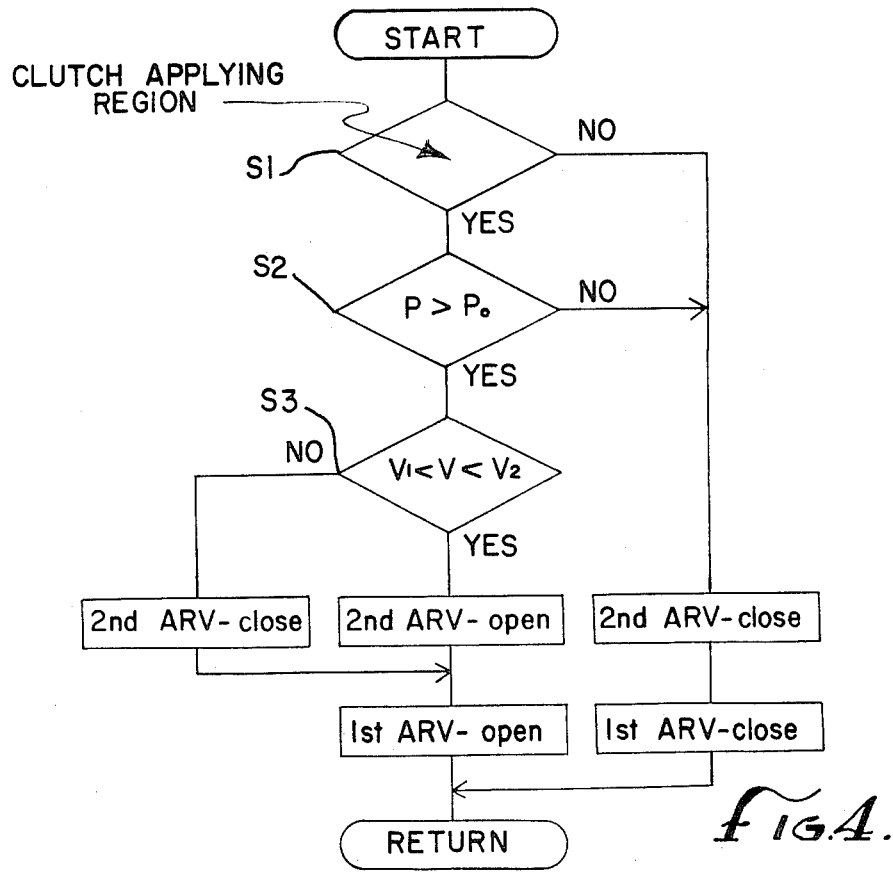
FIG. 4 is a flow chart of the programs for controlling the operation of the electronic control circuit illustrated in FIG. 2.

In the embodiment shown in the Figures, if the outside atmospheric pressure is decreased below the predetermined value as determined by the signal transmitted from the atmospheric pressure detecting means 34, the program of the aforementioned electronic control circuit 31 are so set that the operation of the clutch 20 is entirely discontinued in the normal clutch operation region. FIG. 4 is a flowchart of the programs. Whether the travelling condition of the vehicle falls within the clutch operation region or not is judged in step S1. In step S2 a judgement as to whether the outside atmospheric pressure P exceeds a predetermined value Po or not is made. The task in step S3 is to make a decision on whether a car speed V is at a level between V1 and V2 or not. If the travelling condition does not come within the normal clutch operation region, the judgement is "NO" in S1, and the 1st and 2nd atmospheric air releasing valves 25-1 and 25-2 are closed. While on the other hand, if the condition falls within the clutch operation region, the judgement becomes "YES" in S1, and the program moves to step S2. When the vehicle travels at low altitudes where the outside atmospheric pressure P is comparatively high, the judgement is "YES" in S2, and then the program moves to S3. In this case, if $V1 < V < V2$, the judgement becomes "YES" in S3, whereby the 1st and 2nd atmospheric air releasing valves 25-1 and 25-2 are opened together. If $V < V1$ and $V > V2$, the judgement comes to "NO" in S3. The 2nd atmospheric air releasing valve 25-2 is closed, whereas only the 1st atmospheric air releasing valve 25-1 is opened. In the normal clutch operation region, there are thus obtained three types of clutch operations wherein: (1) the amount of slippage is relatively large in the region where the vehicle-speed is lower than V1; (2) the amount of slippage is relatively small in the region where the speed is higher than V1 but is below the line Z; and (3) no slippage is present in the region where the foregoing control valve 30 is closed and at the same time the speed is above the line Z.

However, when the vehicle travels at high altitudes where the outside atmospheric pressure P is less than the predetermined value Po, even in the normal clutch operation region, the judgement comes to "NO" in step S2 and the following processes are effected. The 1st and 2nd atmospheric air releasing valves 25-1 and 25-2 are closed together; the control valve 23 is changed over to the clutch disconnecting position; the clutch 20 ceases to operate; and the fluid torque transmitting function is provided by the fluid torque converter 4, whereby the action of torque amplification is obtained.

Even when the vehicle travels at higher altitudes, it may be better in some cases to cause the clutch 20 to function in order to obtain effective operation of the engine as a brake on a downhill road. In such a case, the clutch may be operated by not entirely stopping the operation of the clutch 20 in the clutch operation region. The above-described atmospheric pressure detecting means 34 includes, for instance, a semiconductor pressure sensor which transmits an output signal corresponding to the atmospheric pressure. In the case of a vehicle equipped with pressure detecting means for detecting the pressure in the intake suction pipe of the engine for various engine control functions, the pressure in the suction pipe at an engine stopped time or a throttle full-opening time is equivalent to or approximates the outside atmospheric pressure and therefore that detected value may be employed as the outside atmospheric pressure data, whereby the intake pressure detecting means may serve as the atmospheric pressure detecting means. A high vacuum in the intake suction pipe of the engine, characterized by a combination of a throttle opening less than a predetermined throttle opening and a vehicle speed greater than a predetermined vehicle speed, indicates a relatively light working load on the engine. It is well known in the art that engine braking is desired during deceleration or, as mentioned above, when travelling downgrade with a minimum throttle opening to cause slowing of the vehicle (or at least non-acceleration downhill) by the engine without applying the brakes. The program of the electronic control circuit 31 can be set so that when the above conditions are satisfied and engine braking is desired, the effect on the clutch engagement due to the atmospheric pressure detecting means 34 is overridden and the clutch is fully engaged, allowing the desired engine braking.

As is apparent from the above description, the present invention has the following effects. When the vehicle travels at high altitudes where the outside atmospheric pressure is lowered and the engine output is decreased, it is possible to compensate for the drop in acceleration with the help of the action of torque amplification of the fluid torque converter by discontinuing the engaging operation of the clutch, whereby the drivability is improved.

The invention claimed is:

1. In a clutch operation system for a fluid torque converter of a transmission for a vehicle in which the fluid torque converter is connected to an engine and is equipped with a clutch for mechanically connecting an input side thereof to an output side thereof, wherein said clutch normally is operated in a clutch operating region which is predetermined in accordance with a travelling conditions of the vehicle, an improvement characterized in that the operation of said clutch is partially or entirely discontinued when the outside atmospheric pressure is lower than a predetermined value as determined by means for detecting an outside atmospheric pressure.

2. In a clutch operation method for a fluid torque converter of a transmission for a vehicle in which the fluid torque converter is connected to an engine and is equipped with a clutch for mechanically connecting an input side thereof to an output side thereof, wherein said clutch normally is operated in a predetermined clutch engaging operating region in accordance with a travelling conditions of the vehicle, comprising the steps of detecting an outside atmospheric pressure, comparing said detected outside atmospheric pressure to a predetermined pressure value and discontinuing the engaging operation of said clutch when the detected outside atmospheric pressure is lower than said predetermined pressure value.

3. The clutch operation method of claim 2, including steps of detecting vehicle and engine operating conditions to determine whether engine braking is desirable such as during deceleration or when travelling downgrade with a minimal throttle opening, and causing engaging operation of said clutch when said engine braking is desirable regardless of the detected outside atmospheric pressure.

4. The clutch operation method of claim 2 including the steps of detecting the actual vehicle speed, comparing the actual vehicle speed to a predetermined speed range, and only causing said discontinuing the engaging operation of the clutch as a result of the detected outside atmospheric pressure when the actual vehicle speed is within said predetermined speed range.

5. In a clutch operation system for a fluid torque converter of a transmission for a vehicle in which the fluid torque converter is connected to an engine and is equipped with a clutch for mechanically connecting an input side thereof from the engine to an output side thereof, wherein said clutch normally is operated in a predetermined clutch engaging operating region, which is based on the vehicle speed and the throttle opening position, comprising a hydraulic circuit for operating said clutch, atmospheric pressure detecting means, hydraulic pressure releasing valve means, means for controlling the operation of said hydraulic pressure releasing valve means in response to the pressure detected by said atmospheric pressure detecting means for releasing hydraulic pressure from said clutch for discontinuing the normal engaging operation of said clutch in said predetermined clutch engaging operation region where the atmospheric pressure is lower than a predetermined value, thereby causing at least partial disengagement of said clutch below said predetermined value of outside atmospheric pressure.

* * * * *